United States Patent
Eisen et al.

(10) Patent No.: US 10,127,387 B2
(45) Date of Patent: Nov. 13, 2018

(54) CHANGE-TOLERANT METHOD OF GENERATING AN IDENTIFIER FOR A COLLECTION OF ASSETS IN A COMPUTING ENVIRONMENT USING A SECRET SHARING SCHEME

(75) Inventors: Philip Alan Eisen, Ottawa (CA); Michael James Wiener, Nepean (CA); Grant Stewart Goodes, Ottawa (CA); James Muir, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 779 days.

(21) Appl. No.: 14/004,979

(22) PCT Filed: Mar. 15, 2011

(86) PCT No.: PCT/CA2011/050141
§ 371 (c)(1),
(2), (4) Date: Sep. 13, 2013

(87) PCT Pub. No.: WO2012/122621
PCT Pub. Date: Sep. 20, 2012

(65) Prior Publication Data
US 2014/0007252 A1    Jan. 2, 2014

(51) Int. Cl.
*G06F 21/60* (2013.01)
*G06F 21/70* (2013.01)
*G06F 21/73* (2013.01)
*H04L 9/08* (2006.01)
*G06F 21/10* (2013.01)
*H04L 9/32* (2006.01)

(52) U.S. Cl.
CPC .............. *G06F 21/60* (2013.01); *G06F 21/10* (2013.01); *G06F 21/70* (2013.01); *G06F 21/73* (2013.01); *H04L 9/085* (2013.01); *G06F 2221/0706* (2013.01); *H04L 9/32* (2013.01)

(58) Field of Classification Search
USPC .......................................................... 726/26
See application file for complete search history.

(56) References Cited

U.S. PATENT DOCUMENTS

| 7,290,149 B2 | 10/2007 | Alabraba et al. |
| 7,296,294 B2 | 11/2007 | Hughes |
| 7,302,590 B2 | 11/2007 | Dublish et al. |

(Continued)

FOREIGN PATENT DOCUMENTS

JP    2007322822 A    12/2007

OTHER PUBLICATIONS

Extended European Search Report cited in corresponding European Application No. 11861100.3 dated Jan. 30, 2015.

*Primary Examiner* — Jeffrey Pwu
*Assistant Examiner* — Samuel Ambaye
(74) *Attorney, Agent, or Firm* — Rimon, P.C.; Marc S. Kaufman (57) ABSTRACT

A secure and fault-tolerant, or variation-tolerant, method and system to turn a set of N shares into an identifier even when only M shares from this set have a correct value. A secret sharing algorithm is used to generate a number of candidate identifiers from subsets of shares associated with asset parameters of a collection of assets. The most frequently occurring candidate identifier is then determined to be the final identifier. The method has particular applicability in the fields of node locking and fingerprinting.

48 Claims, 3 Drawing Sheets

(56) References Cited

U.S. PATENT DOCUMENTS

| | | |
|---|---|---|
| 7,647,640 B2 | 1/2010 | Hughes |
| 7,779,274 B2 | 8/2010 | Dublish et al. |
| 2001/0044782 A1 | 11/2001 | Hughes et al. |
| 2004/0177168 A1* | 9/2004 | Alabraba et al. ................ 710/1 |
| 2008/0098482 A1* | 4/2008 | Hughes ................ G06F 21/125 |
| | | 726/26 |
| 2008/0115173 A1* | 5/2008 | Ellis et al. ...................... 725/61 |
| 2009/0313480 A1* | 12/2009 | Michiels et al. ............. 713/187 |
| 2010/0031128 A1* | 2/2010 | Obana .................... H04L 9/085 |
| | | 714/784 |

* cited by examiner

CHANGE-TOLERANT METHOD OF GENERATING AN IDENTIFIER FOR A COLLECTION OF ASSETS IN A COMPUTING ENVIRONMENT USING A SECRET SHARING SCHEME

FIELD

The present disclosure relates generally to generating identifiers. More particularly, the present disclosure relates to a change-tolerant method of generating an identifier for a collection of assets in a computing environment using a secret sharing scheme, such as can be used for node locking and fingerprinting of computer systems.

BACKGROUND

Many protection technologies for personal computer (PC) systems need a mechanism to robustly identify the PC on which the application is running. This is generally accomplished by reading out device identifiers from various assets of the system, such as hardware devices (motherboard parameters, BIOS, MAC address, hard disk, CD/DVD player, graphics card, I/O controllers) that are integrated into the computer. These device identifiers are then combined into an identifier of the system. A simple way to derive the system identifier is applying an exclusive-or (XOR) to all device identifiers.

As computer hardware parts, or other assets, change, such as due to replacement and repairs, a method to determine the system identifier needs to accommodate occasional changes to the device identifiers. One way of supporting hardware updates is by allowing a few device identifiers to change while still generating the same system identifier. A known way to achieve this is by recording the unique device identifiers during an initialization phase and, during the identifier calculation phase, comparing the recorded parameters with the actual parameters. If a sufficient match exists, the recorded parameters are used to calculate the system identifier.

There are similar methods that derive a system identifier from a collection of contributing pieces of information that may change over time. Although based on different contributing information, such methods also need to accommodate changes to the contributing information without changing the calculated identifier. As before the method consists of recording the contributing information and use recorded information if there is a sufficient match between the actual information and the recorded information.

One problem with such methods is that the comparison of the recorded device identifiers with the retrieved parameters is sensitive to attacks. The presence of the recorded device identifiers is the key enabler for these attacks. It is, therefore, desirable to provide a method of generating a system identifier that is tolerant of changes in the computing environment, while being resistant to malicious attacks.

SUMMARY

In a first aspect, there is provided a change-tolerant method of generating an identifier for a collection of assets associated with a computing environment. Each of the assets has an asset parameter associated therewith. The method comprises retrieving asset parameters for the collection of assets; generating a share corresponding to each asset parameter to provide a plurality of shares; applying a secret sharing algorithm to a number of subsets of the plurality of shares to derive a plurality of candidate identifiers, the number of subsets determined in accordance with a tolerance threshold for differences in the asset parameters as compared to original asset parameters of the computing environment; and determining a most prevalent of the candidate identifier values as a final identifier for the collection of assets. The final identifier can, for example, determine if a software application can be validly executed on the collection of assets.

According to embodiments, prior to generating the shares, each asset parameter can be generated by normalizing the asset parameters, such as by applying a hash function to the asset parameters. The secret sharing algorithm can be a (M−k, N)-secret sharing algorithm, where N is the number of the plurality of shares, M<N, and k is a predetermined constant, and where the tolerance threshold is equal to N−M.

The most prevalent of the candidate identifiers can comprise a candidate identifier having a highest frequency of occurrence amongst the candidate identifiers, or a candidate identifier that occurs a predetermined number of times, in which case the secret sharing algorithm can terminate once the candidate identifier has occurred the predetermined number of times.

According to further aspects, there is provided a method of node locking to restrict execution of an application to a given computer system, and a non-transitory computer-readable for storing instructions to execute the method. The computer system has a plurality of assets, and each asset has an asset parameter associated therewith.

The method comprises retrieving asset parameters for the assets of the computer system; generating a share corresponding to each asset parameter to provide a plurality of shares; applying a secret sharing algorithm to subsets of the plurality of shares to derive a plurality of candidate identifiers; determining a most prevalent of the candidate identifier values as the system identifier for the computer system; and executing the application on the computer system in accordance with the system identifier. Prior to generating the shares, each asset parameter can be normalized, such as by applying a hash function to the asset parameters.

To effect the node locking, the application can be modified to restrict its valid execution only on the given collection of assets. Such modification can comprise obtaining original asset parameters of assets of the collection of assets; encrypting the original asset parameters to provide corresponding ciphertext constants; and embedding the ciphertext constants in the application. The original asset parameters can be encrypted by combining them with predetermined shares determined in accordance with the secret sharing algorithm, such as by applying an exclusive or function to the original asset parameters and the predetermined shares. The shares corresponding to each asset parameter can be generated by combining each of the asset parameters with corresponding ones of the ciphertext constants, such as by applying an exclusive or function to the each of the asset parameters and the corresponding ones of the ciphertext constants.

As in the first aspect, the secret sharing algorithm can be a (M−k, N)-secret sharing algorithm, where N is the number of the plurality of shares, M<N, and k is a predetermined constant, and the tolerance threshold is equal to N−M. The most prevalent of the candidate identifiers can comprise a candidate identifier having a highest frequency of occurrence amongst the candidate identifiers, or a candidate identifier that occurs a predetermined number of times, in which case the secret sharing algorithm can terminate once the candidate identifier has occurred the predetermined number of times.

BRIEF DESCRIPTION OF THE DRAWINGS

Embodiments of the present disclosure will now be described, by way of example only, with reference to the attached Figures.

DETAILED DESCRIPTION

The present disclosure provides a secure and fault-tolerant, or variation-tolerant, method to turn a set of N shares into an identifier even when only M shares from this set have a correct value. According to an embodiment, the method uses all subsets of M−1 shares from the N shares to generate candidate identifiers. According to an embodiment, the most frequently occurring of the generated candidate identifiers is the final resulting identifier. If no candidate identifier occurs more often than the others, this means that fewer than M of N assets were correct. In such a case, a random value can be returned as the system identifier. Such a random value could be obtained by, for example, adding two of the candidate identifiers together. An alternative embodiment terminates the first time two different subsets of M−1 shares produce the same candidate identifier, based on the assumption that identical candidates are very unlikely for random subsets of shares that have errors.

The present method can be adapted to use any (M−k, N)-secret sharing scheme. The method can be used generally to generate an identifier for any collection of assets for which asset parameters can be assigned or determined. As used herein, an "asset" is any data, application, device, node or other component of a computing environment. Assets generally include hardware (e.g. servers and switches), software (e.g. mission critical applications and support systems) and confidential information. The terms "computing environment" and "computer system" are used herein interchangeably, and are intended to encompass single computers and other devices including a processor, distributed computing systems, components thereof, data stored or otherwise associated therewith, and including the data associated with users of such computer systems, attached or accessible peripheral devices, software applications and operating systems, and combinations thereof. As used herein, "asset parameter" means an assigned or determined parameter that is limited in occurrence for a given class of asset, situation, or area. Asset parameters may be unique or may exclusively identify an asset at least at the time the parameter is assigned or determined. Asset parameters can be expressed as, for example, numbers, symbols, strings of numbers and characters, or functions.

An example system in which the present method can be used is a computer that has a number of peripheral devices each having a more or less unique device identifier, such as a serial number or other assigned asset parameter. Generally, such device identifiers are assigned to a device by the manufacturer. The method also can be applied to a network of embedded microcontrollers in which each microcontroller has a unique identifier. Such configurations commonly occur in more complex systems (e.g. airplanes, cars, industrial machines) that are repaired by replacing entire microcontroller modules. In such machines it may be beneficial to link the firmware for the controllers to the particular networked set. Data sources associated with, or stored on, a computer system can also be considered assets. Examples include contact lists, user preference settings, name, address, dates or other parameters that change relatively infrequently. Asset parameters can be obtained by applying a function to parameters associated with one or more assets. For example, an asset parameter may result from a function that takes parameters associated with computer memory, a particular application, or a collection of files as input. Certain asset parameters may also require user input (e.g. a password, the inserting of a removable data source or the scanning of a fingerprint) in order to become available for processing by the method described herein.

The present method can be applied for node locking or fingerprinting applications. Node locking is relevant to a wide range of applications in different fields. It can be used on personal computers (PCs), and also on embedded devices. The method is described in the form of a fingerprinting application that permits node locking. Node locking is a feature that limits a particular application to execute on a single or a small number of computers (e.g. a PC, a set-top box, a game console or a mobile phone). If the application is executed on a different apparatus the application will perform a different operation as on the computer that it is intended to execute on. A method to implement node locking links the application to a collection of asset parameters obtained from devices in the computer, known as fingerprinting. This means that the application has a personalization stage where it is configured for execution on the intended set of computers. During a later stage, the application will collect the asset parameters from the devices in the computer system on which it is executing in order to derive a system identifier (fingerprint). The system identifier can be used for a wide range of functions that the application only supports on that particular computer system. The present method permits one or more of the asset parameters collected at the later stage to differ from the original asset parameters used in personalizing the application, while still returning a valid fingerprint that results in proper execution of the application.

Effectively, the present method turns a set of N shares into an identifier. The method uses all subsets of M−k shares from the N shares to generate a candidate identifier with an (M−k, N) secret sharing module. Whichever of the generated candidate identifiers occurs the most frequently is used as the final resulting identifier. A variant method terminates as soon as a candidate identifier with a given value occurs more than t (with t>1) times. The threshold parameter t is in the range $$\left(2 \ldots \binom{M}{k}\right)$$

with a higher value reducing the odds that an incorrect candidate identifier value is selected, where the notation $$\binom{n}{k}$$

defines a binomial coefficient and $$\binom{n}{k} = \frac{n!}{k!(n-k)!} \text{ for } 0 \le k \le n.$$

An embodiment uses k=1 and evaluates all subsets. Note that for a valid identifier to be produced by this method, at least M shares must be correct in which case at least one candidate identifier will occur $$\binom{M}{k}$$

times.

Figure 1:
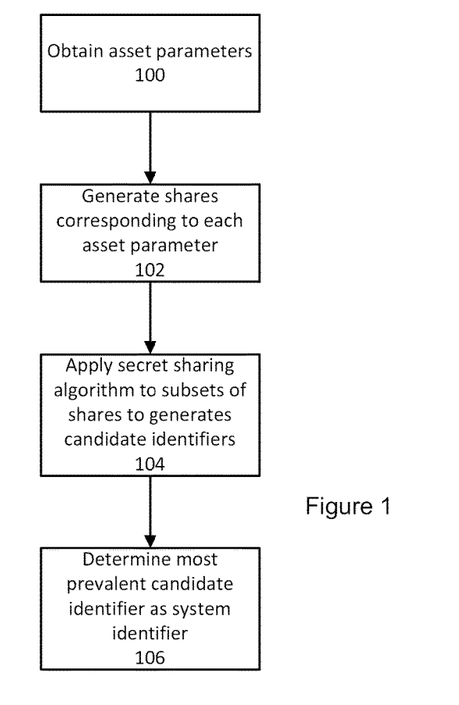
FIG. 1 is a flowchart of an embodiment of the method of the present invention.

As shown in FIG. 1, the present disclosure generally describes a method of identifying or validating a collection of assets, such as components or other assets of a computer system, for execution of an application, such as for node locking, using a novel fingerprinting method. A number of asset parameters are associated with the collection of assets to be validated. While the present method is described in relation to validating a collection of assets for execution of an application, it will be understood that the present method can be used to validate, or confirm the identity of, a collection of assets for any operation to be performed on or in conjunction with the collection of assets, and where a variation between the original assets of the collection is permitted. A correct system identifier is returned even when a number of asset parameters have changed since the application was first validated for execution on the collection of assets. The degree of variation is determined by a tolerance threshold, which can be set by the application distributor or others.

The method commences with the retrieval of the asset parameters for the collection of assets (100). A share corresponding to each asset parameter is then generated to provide a plurality of shares (102). A secret sharing algorithm is then applied to a number of subsets of the shares to derive a plurality of candidate identifiers each having a candidate identifier value (104). The number of subsets is determined in accordance with a tolerance threshold, which is related to the acceptable difference in the asset parameters as compared to initial asset parameters of the collection of assets. In other words, the tolerance threshold is a measure of the amount of variation in the asset parameters for which the application, or other operation, was originally validated, as deemed acceptable by the application creator or others. The most prevalent of the candidate identifier values is determined, and this candidate identifier value is then selected as the final identifier (106). The final identifier determines if the application can be validly executed on the collection of assets.

Figure 2:
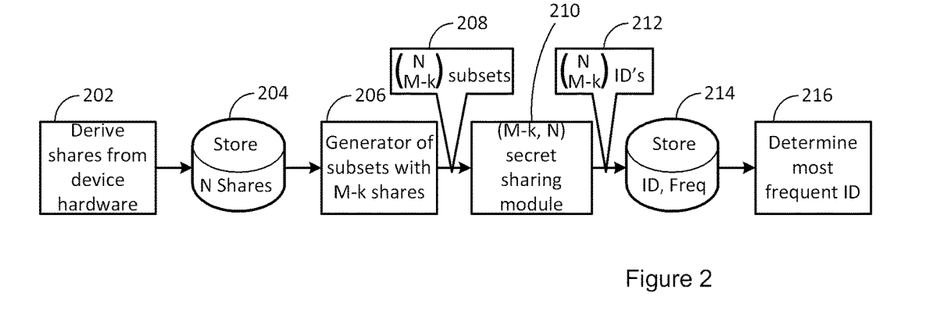
FIGS. 2-4 are diagrams of a node locking method according to embodiments of the present invention.

An embodiment of an application performing a node locking method according to the invention is shown in FIG. 2. The method starts by first extracting asset parameters from the assets of the collection of assets and converting them into shares (202). Some of the asset parameters and the related shares may have a value that is different from the same asset parameter used during personalization, or initialization, of the application (i.e., the shares are incorrect). The N shares are stored in a memory (204). From all the recorded shares all possible subsets of M−k shares are generated (206). For each of the $$\binom{N}{M-k}$$

subsets 208 a candidate identifier is calculated using a (M−k, N)-secret sharing algorithm (210). Any suitable (M−k, N)-secret sharing algorithms can be used, depending on the application and functional requirements. Well-known (M−k, N)-secret sharing algorithms include, for example, Shamir's and Blakley's secret sharing algorithms.

For each of the candidate identifiers that the secret sharing module produces, the candidate identifier 'ID' and the number of times it has been produced as an output 'Freq' is recorded (214) in a storage using a suitable indexing mechanism to efficiently retrieve and update the frequency of occurrence 'Freq' for a given candidate identifier 'ID'. After processing all subsets to generate $$\binom{N}{M-k}$$

IDs 212, the stored {ID, Freq} data pairs are processed to find the candidate identifier with the highest frequency and this candidate identifiers is selected as the final identifier (216). The frequency of the final identifier, among the candidate identifiers, is an indication of the error rate in the asset parameters. If made available to the application it may be used for diagnostic or recovery purposes.

Figure 3:
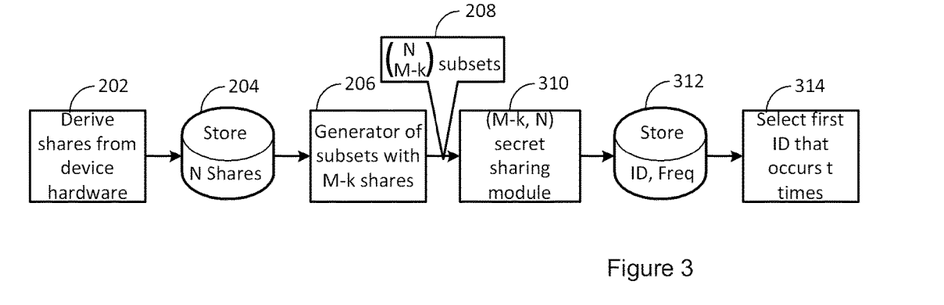

An alternative implementation of the node locking method is shown in FIG. 3. The method again starts by first extracting, reading, or otherwise obtaining, asset parameters from the assets in the system and converting them into shares (202), and storing the N shares in a memory (204). From all the recorded shares all possible subsets of M−k shares are generated (206). However, instead of processing all $$\binom{N}{M-k}$$

subsets 208 at the (M−k, N)-secret sharing module 310, the candidate identifier values are monitored as they are placed into the store 314. The first candidate identifier value that occurs t times both determines the final identifier and terminates the method. The threshold parameter t is in the range $$\left(2 \ldots \binom{M}{k}\right)$$

with a higher value reducing the odds that an incorrect candidate identifier value is selected. The benefit of this method is a possibly shorter processing time, but there is no indication of the error rate in the asset parameters and the time of terminating the process may be used as a point of attack.

Figure 4:
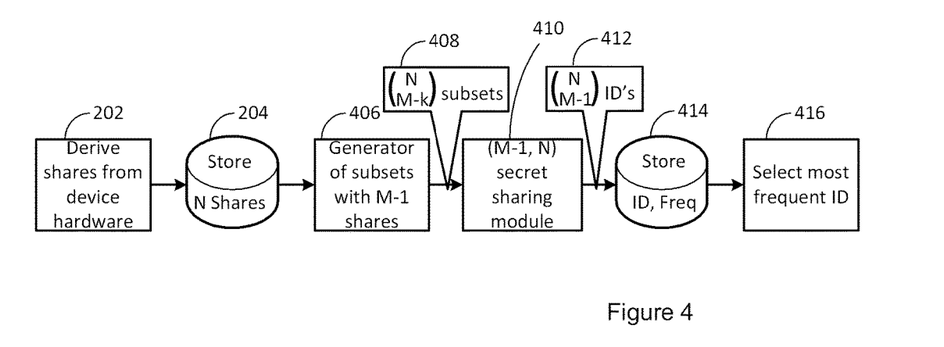

An embodiment using k=1, and adopting the first embodiment described above in respect of FIG. 2, is shown in FIG. 4. As described above, the method begins by first extracting asset parameters from the devices in the computer and converting them into shares (202). The N shares are stored in a memory (204). From all the recorded shares all possible subsets of M−1 shares are generated (406). For each of the $$\binom{N}{M-1}$$

subsets 408 a candidate identifier 'ID' is calculated using a (M−1, N)-secret sharing algorithm (410). For each of the ID values that the secret sharing module produces, the candidate identifier value 'ID' and the number of times it has been produced as an output 'Freq' is recorded (414) in a storage. After processing all subsets to generate $$\binom{N}{M-1}$$

IDs 412, the stored {ID, Freq} data pairs are processed to find the candidate identifier value with the highest frequency and this ID value is selected as the final identifier (416). According to this embodiment, up to N−M shares can be incorrect and still support the calculation of the final identifier. Thus, the tolerance threshold is determined directly by M.

In order to properly configure an application for using any of the above methods, the application needs to be personalized for a particular computer. In other words, a generic version of the application is modified for execution on a particular computer or set of computers. This may be implemented using a personalizing application running at a computer that is in contact with a personalization server (and possibly using other verification mechanism such as a personal contact or a telephone conversation). It also is possible to deploy the installation with a built-in personalization component that is disabled after completion of the personalization process.

Figure 5:
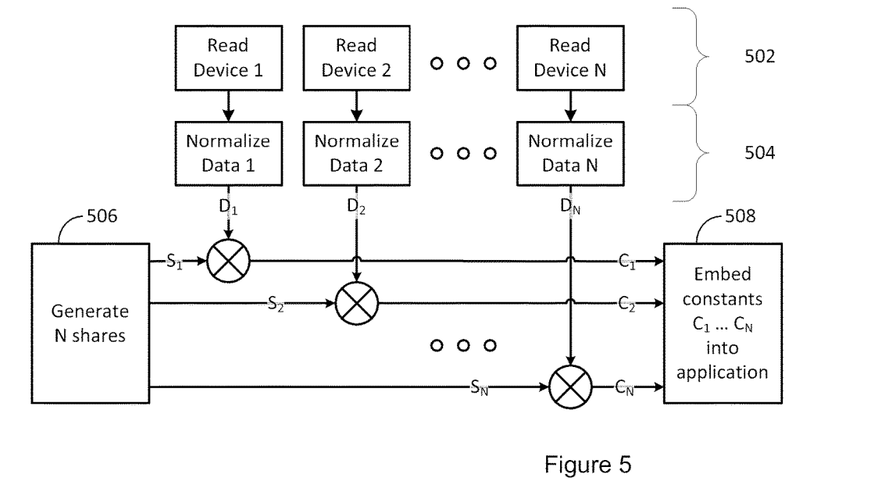
FIG. 5 is a diagram of an application personalization process according to an embodiment.

A diagram of the personalization process is shown in FIG. 5. The personalization application running at the target computer first obtains a suitable number of device parameters by reading asset parameters for devices 1−N (502). In an embodiment, the device parameters are then normalized (504) The normalization can be effected by, for example, using a hash function, to generate a set of normalized asset parameters $\{D_1, D_2, \ldots D_N\}$.

During the personalization, N shares $\{S_1, S_2, \ldots S_N\}$ are generated (506). As will be understood by those of skill in the art, the manner in which the shares are generated, or constructed, depends on the secret-sharing method used. For example, if Shamir's secret sharing algorithm is used, a polynomial with random coefficients is constructed. The degree of the polynomial is dependent on N, M and k, as determined by design and security considerations. The shares are then determined by evaluating the polynomial for chosen inputs. The N shares $\{S_1, S_2, \ldots S_N\}$ are used in the key sharing algorithm to calculate the final identifier of the collection of assets. Each share $S_i$ is combined with the corresponding asset parameters $D_i$ using a function $E(D_i, S_i)$. The function E( ) can be seen as an encryption of the share $S_i$ using the asset parameter $D_i$ and producing the ciphertext constant $C_i$. A simple implementation of E( ) is an XOR operation. The final personalization step embeds the ciphertext constants $\{C_1, C_2, \ldots C_N\}$ as personalization information into the application (508).

Figure 6:
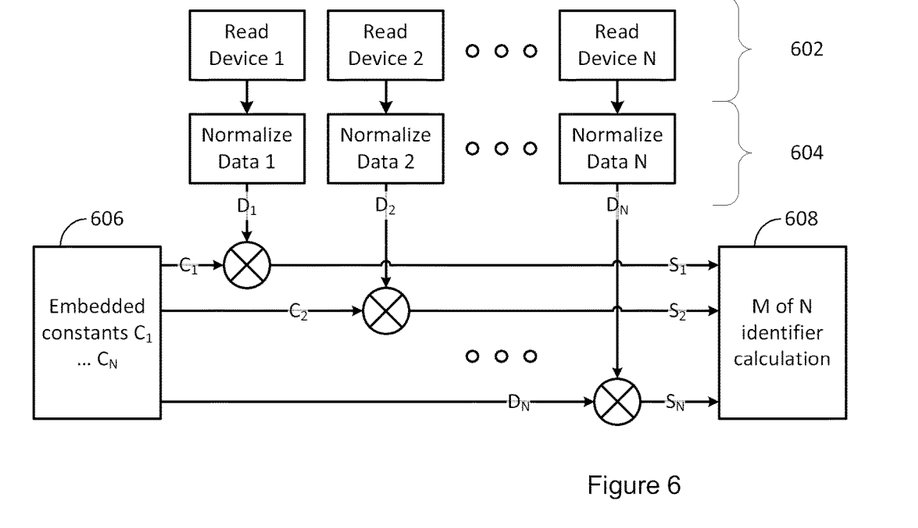
FIG. 6 is a diagram of a method of generating shares according to an embodiment.

The generation of shares during validation of the personalized application is shown in FIG. 6. The device parameters are again acquired (602) and normalized (604) to produce a set of asset normalized parameters $\{D_1, D_2, \ldots D_N\}$. The personalization information in the application contains the ciphertext constants $\{C_1, C_2, \ldots C_N\}$. Each ciphertext constant $C_i$ is combined with the corresponding asset parameter $D_i$ using a function $D(D_i, C_i)$ (606). The function D( ) can be seen as an decryption of the ciphertext constant $C_i$ with the asset parameter $D_i$ and producing the share $S_i$. A simple implementation of D( ) is an XOR operation. The personalized application then uses the shares in the calculation of the final identifier of the collection of assets as described above.

As will be appreciated, the present method provides a way to derive a single result (e.g. a system identifier or a secret) from a number of contributing pieces of information that combined provide a strong identification of a consumer personal apparatus or a person. The method has the novel feature that it produces the same identifier even when some of the initial contributing information is modified, and does so without a priori knowledge of which information is modified. Resilience against such errors is useful for node locking or fingerprinting of an application. As the shares are used directly to calculate the identifier, there is no need to store the original values of the shares. This prevents attacks that target stored values of the original asset parameters. As contrasted to methods that verify the correctness of each share prior to generating a final identifier, which presents a security weakness for software in the white-box attack context, the present method never needs to explicitly check which shares are correct.

The resilience against errors also can be used in authentication if several contributing pieces of information (names, passwords, biometric information, hardware tokens) are requested to provide access to a service or a device and some inputs have changed.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claim is:

1. A change-tolerant method of generating an identifier for a plurality of assets associated with a computing environment, each of the assets having an asset parameter associated therewith, the method comprising:
    retrieving asset parameters for the plurality of assets;
    generating a share corresponding to each asset parameter to produce a plurality of shares;
    applying a secret sharing algorithm to a plurality of shares to generate a plurality of candidate identifiers corresponding to the plurality of subsets of shares; and
    selecting a candidate identifier from the plurality of candidate identifiers as a final identifier for the plurality of assets based at least in part on a frequency of occurrence of that candidate identifier, wherein the final identifier is configured to provide verification of the plurality of assets without requiring individual verification of any shares in the plurality of shares.

2. The method of claim 1, wherein generating a share corresponding to each asset parameter comprises normalizing the asset parameters prior to generating the shares.

3. The method of claim 2, wherein normalizing the asset parameters comprises applying a hash function to the asset parameters.

4. The method of claim 1, wherein the final identifier is configured to provide verification of the plurality of assets when a portion of asset parameters within a predetermined tolerance threshold are different than initial asset parameters.

5. The method of claim 4, wherein the secret sharing algorithm is a (M–k, N)-secret sharing algorithm, where N is the number of the plurality of shares, M<N, and k is a predetermined constant.

6. The method of claim 5, wherein the tolerance threshold is equal to N–M.

7. The method of claim 1, wherein selecting a candidate identifier from the plurality of candidate identifiers based at least in part on a frequency of occurrence of that candidate identifier comprises selecting a candidate identifier having a highest frequency of occurrence amongst the plurality of candidate identifiers.

8. The method of claim 1, wherein selecting a candidate identifier from the plurality of candidate identifiers based at least in part on a frequency of occurrence of that candidate identifier comprises selecting a candidate identifier that occurs a predetermined number of times.

9. The method of claim 8, wherein applying the secret sharing algorithm is terminated once the candidate identifier has occurred the predetermined number of times.

10. The method of claim 1, further comprising:
    executing an application on the computing environment in accordance with the final identifier.

11. The method of claim 10, further comprising modifying the application to restrict its valid execution only on the plurality of assets.

12. The method of claim 11, wherein modifying the application comprises:
    obtaining original asset parameters of assets in the plurality of assets;
    encrypting the original asset parameters to provide corresponding ciphertext constants; and
    embedding the ciphertext constants in the application.

13. The method of claim 12, wherein encrypting the original asset parameters comprises combining the original asset parameters with predetermined shares determined in accordance with the secret sharing algorithm.

14. The method of claim 13, wherein combining the original asset parameters with predetermined shares comprises applying an exclusive or function to the original asset parameters and the predetermined shares.

15. The method of claim 12, wherein generating a share corresponding to each asset parameter comprises combining each of the asset parameters with corresponding ones of the ciphertext constants.

16. The method of claim 15, wherein combining each of the asset parameters with corresponding ones of the ciphertext constants comprises applying an exclusive or function to the each of the asset parameters and the corresponding ones of the ciphertext constants.

17. At least one non-transitory computer-readable medium storing computer-readable instructions that, when executed by one or more computing devices, cause at least one of the one or more computing devices to:
    retrieve asset parameters for a plurality of assets of a computing environment, each asset having an asset parameter associated therewith;
    generate a share corresponding to each asset parameter to produce a plurality of shares;;
    apply a secret sharing algorithm to a plurality of subsets of shares to generate a plurality of candidate identifiers corresponding to the plurality of subsets of shares; and
    select a candidate identifier from the plurality of candidate identifiers as a final identifier for the plurality of assets based at least in part on a frequency of occurrence of that candidate identifier, wherein the final identifier is configured to provide verification of the plurality of assets without requiring individual verification of any shares in the plurality of shares.

18. The at least one non-transitory computer-readable medium of claim 17, wherein the instructions that, when executed by at least one of the one or more computing devices, cause at least one of the one or more computing devices to generate a share corresponding to each asset parameter further cause at least one of the one or more computing devices to:
    normalize the asset parameters prior to generating the shares.

19. The at least one non-transitory computer-readable medium of claim 18, wherein the instructions that, when executed by at least one of the one or more computing devices, cause at least one of the one or more computing devices to normalize the asset parameters further cause at least one of the one or more computing devices to:
    apply a hash function to the asset parameters.

20. The at least one non-transitory computer-readable medium of claim 17, wherein the final identifier is configured to provide verification of the plurality of assets when a portion of asset parameters within a predetermined tolerance threshold are different than initial asset parameters.

21. The at least one non-transitory computer-readable medium of claim 20, wherein the secret sharing algorithm is a (M–k, N)-secret sharing algorithm, where N is the number of the plurality of shares, M<N, and k is a predetermined constant.

22. The at least one non-transitory computer-readable medium of claim 21, wherein the tolerance threshold is equal to N–M.

23. The at least one non-transitory computer-readable medium of claim 17, wherein the instructions that, when executed by at least one of the one or more computing devices, cause at least one of the one or more computing devices to select a candidate identifier from the plurality of candidate identifiers based at least in part on a frequency of occurrence of that candidate identifier further cause at least one of the one or more computing devices to:
  select a candidate identifier having a highest frequency of occurrence amongst the plurality of candidate identifiers.

24. The at least one non-transitory computer-readable medium of claim 17, wherein the instructions that, when executed by at least one of the one or more computing devices, cause at least one of the one or more computing devices to select a candidate identifier from the plurality of candidate identifiers based at least in part on a frequency of occurrence of that candidate identifier further cause at least one of the one or more computing devices to:
  select a candidate identifier that occurs a predetermined number of times.

25. The at least one non-transitory computer-readable medium of claim 24, wherein the instructions that, when executed by at least one of the one or more computing devices, cause at least one of the one or more computing devices to apply the secret sharing algorithm further cause at least one of the one or more computing devices to:
  terminate applying the secret sharing algorithm once the candidate identifier has occurred the predetermined number of times.

26. The at least one non-transitory computer-readable medium of claim 17, further storing computer-readable instructions that, when executed by at least one of the one or more computing devices, cause at least one of the one or more computing devices to:
  execute an application on the computing environment in accordance with the final identifier.

27. The at least one non-transitory computer-readable medium of claim 26, further storing computer-readable instructions that, when executed by at least one of the one or more computing devices, cause at least one of the one or more computing devices to:
  modify the application to restrict its valid execution only on the plurality of assets.

28. The at least one non-transitory computer-readable medium of claim 27, wherein the instructions that, when executed by at least one of the one or more computing devices, cause at least one of the one or more computing devices to modify the application further cause at least one of the one or more computing devices to:
  obtain original asset parameters of assets in the plurality of assets;
  encrypt the original asset parameters to provide corresponding ciphertext constants; and
  embed the ciphertext constants in the application.

29. The at least one non-transitory computer-readable medium of claim 28, wherein the instructions that, when executed by at least one of the one or more computing devices, cause at least one of the one or more computing devices to encrypt the original asset parameters further cause at least one of the one or more computing devices to:
  combine the original asset parameters with predetermined shares determined in accordance with the secret sharing algorithm.

30. The at least one non-transitory computer-readable medium of claim 29, wherein the instructions that, when executed by at least one of the one or more computing devices, cause at least one of the one or more computing devices to combine the original asset parameters with predetermined shares further cause at least one of the one or more computing devices to:
  apply an exclusive or function to the original asset parameters and the predetermined shares.

31. The at least one non-transitory computer-readable medium of claim 28, wherein the instructions that, when executed by at least one of the one or more computing devices, cause at least one of the one or more computing devices to generate a share corresponding to each asset parameter further cause at least one of the one or more computing devices to:
  combine each of the asset parameters with corresponding ones of the ciphertext constants.

32. The at least one non-transitory computer-readable medium of claim 31, wherein the instructions that, when executed by at least one of the one or more computing devices, cause at least one of the one or more computing devices to combine each of the asset parameters with corresponding ones of the ciphertext constants further cause at least one of the one or more computing devices to:
  apply an exclusive or function to the each of the asset parameters and the corresponding ones of the ciphertext constants.

33. An apparatus for generating an identifier for a plurality of assets associated with a computing environment, each of the assets having an asset parameter associated therewith, the apparatus comprising:
  one or more processors; and
  one or more memories operatively coupled to at least one of the one or more processors and having instructions stored thereon that, when executed by at least one of the one or more processors, cause at least one of the one or more processors to:
    retrieve asset parameters for the plurality of assets;
    generate a share corresponding to each asset parameter to produce a plurality of shares;
    apply a secret sharing algorithm to a plurality of subsets of shares to generate a plurality of candidate identifiers corresponding to the plurality of subsets of shares; and
    select a candidate identifier from the plurality of candidate identifiers as a final identifier for the plurality of assets based at least in part on a frequency of occurrence of that candidate identifier, wherein the final identifier is configured to provide verification of the plurality of assets without requiring individual verification of any shares in the plurality of shares.

34. The apparatus of claim 33, wherein the instructions that, when executed by at least one of the one or more processors, cause at least one of the one or more processors to generate a share corresponding to each asset parameter further cause at least one of the one or more processors to:
  normalize the asset parameters prior to generating the shares.

35. The apparatus of claim 34, wherein the instructions that, when executed by at least one of the one or more processors, cause at least one of the one or more processors to normalize the asset parameters further cause at least one of the one or more processors to:
  apply a hash function to the asset parameters.

36. The apparatus of claim 33, wherein the final identifier is configured to provide verification of the plurality of assets when a portion of asset parameters within a predetermined tolerance threshold are different than initial asset parameters.

37. The apparatus of claim 36, wherein the secret sharing algorithm is a (M–k, N)-secret sharing algorithm, where N is the number of the plurality of shares, M<N, and k is a predetermined constant.

38. The apparatus of claim 37, wherein the tolerance threshold is equal to N–M.

39. The apparatus of claim 33, wherein the instructions that, when executed by at least one of the one or more processors, cause at least one of the one or more processors to select a candidate identifier from the plurality of candidate identifiers based at least in part on a frequency of occurrence of that candidate identifier further cause at least one of the one or more processors to:
   select a candidate identifier having a highest frequency of occurrence amongst the plurality of candidate identifiers.

40. The apparatus of claim 33, wherein the instructions that, when executed by at least one of the one or more processors, cause at least one of the one or more processors to select a candidate identifier from the plurality of candidate identifiers based at least in part on a frequency of occurrence of that candidate identifier further cause at least one of the one or more processors to:
   select a candidate identifier that occurs a predetermined number of times.

41. The apparatus of claim 40, wherein the instructions that, when executed by at least one of the one or more processors, cause at least one of the one or more processors to apply the secret sharing algorithm further cause at least one of the one or more processors to:
   terminate applying the secret sharing algorithm once the candidate identifier has occurred the predetermined number of times.

42. The apparatus of claim 33, wherein at least one of the one or more memories has further instructions stored thereon that, when executed by at least one of the one or more processors, cause at least one of the one or more processors to:
   execute an application on the computing environment in accordance with the final identifier.

43. The apparatus of claim 42, wherein at least one of the one or more memories has further instructions stored thereon that, when executed by at least one of the one or more processors, cause at least one of the one or more processors to:
   modify the application to restrict its valid execution only on the plurality of assets.

44. The apparatus of claim 43, wherein the instructions that, when executed by at least one of the one or more processors, cause at least one of the one or more processors to modify the application further cause at least one of the one or more processors to:
   obtain original asset parameters of assets in the plurality of assets;
   encrypt the original asset parameters to provide corresponding ciphertext constants; and
   embed the ciphertext constants in the application.

45. The apparatus of claim 44, wherein the instructions that, when executed by at least one of the one or more processors, cause at least one of the one or more processors to encrypt the original asset parameters further cause at least one of the one or more processors to:
   combine the original asset parameters with predetermined shares determined in accordance with the secret sharing algorithm.

46. The apparatus of claim 45, wherein the instructions that, when executed by at least one of the one or more processors, cause at least one of the one or more processors to combine the original asset parameters with predetermined shares further cause at least one of the one or more processors to:
   apply an exclusive or function to the original asset parameters and the predetermined shares.

47. The apparatus of claim 44, wherein the instructions that, when executed by at least one of the one or more processors, cause at least one of the one or more processors to generate a share corresponding to each asset parameter further cause at least one of the one or more processors to:
   combine each of the asset parameters with corresponding ones of the ciphertext constants.

48. The apparatus of claim 47, wherein the instructions that, when executed by at least one of the one or more processors, cause at least one of the one or more processors to combine each of the asset parameters with corresponding ones of the ciphertext constants further cause at least one of the one or more processors to:
   apply an exclusive or function to the each of the asset parameters and the corresponding ones of the ciphertext constants.

* * * * *